United States Patent
Bian et al.

(10) Patent No.: US 6,572,989 B2
(45) Date of Patent: Jun. 3, 2003

(54) THIN FILM MAGNETIC RECORDING DISK WITH A CHROMIUM-NICKEL PRE-SEED LAYER

(75) Inventors: Xiaoping Bian, San Jose, CA (US); Mary Frances Doerner, Santa Cruz, CA (US); Tim Minvielle, San Jose, CA (US); Mohammad Taghi Mirzamaani, San Jose, CA (US); Kai Tang, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 29 days.

(21) Appl. No.: 09/876,571

(22) Filed: Jun. 6, 2001

(65) Prior Publication Data

US 2003/0008177 A1 Jan. 9, 2003

(51) Int. Cl.$^7$ .............. G11B 5/66; G11B 5/70; B32B 15/00; B05D 5/12
(52) U.S. Cl. ............. 428/694 TS; 428/216; 428/336; 428/611; 428/666; 428/667; 428/680; 428/694 TM; 428/900; 427/131; 427/132
(58) Field of Search .......... 428/694 TS, 216, 428/336, 694 TM, 900, 611, 652, 666, 667, 680; 360/97.01; 427/131, 132

(56) References Cited

U.S. PATENT DOCUMENTS

| | | | |
|---|---|---|---|
| 5,180,640 A | 1/1993 | Yamashita et al. | 425/611 |
| 5,456,978 A | 10/1995 | Lal et al. | 428/332 |
| 5,693,426 A | 12/1997 | Lee et al. | 428/611 |
| 5,789,056 A | 8/1998 | Bian et al. | 428/65.3 |
| 5,789,090 A | 8/1998 | Okumura et al. | 428/694 |
| 5,908,514 A | 6/1999 | Ranjan et al. | 148/313 |
| 6,013,161 A | 1/2000 | Chen et al. | 204/192.2 |
| 6,159,625 A | * 12/2000 | Ueno | 428/694 T |
| 6,280,813 B1 | * 8/2001 | Carey et al. | 428/65.3 |

OTHER PUBLICATIONS

IEEE Transactions on Magnetics, Sep. 1997, vol. 33, No. 5.

* cited by examiner

*Primary Examiner*—Holly Rickman
(74) *Attorney, Agent, or Firm*—Robert O. Guillot; IPLO Intellectual Property Law Offices

(57) ABSTRACT

In a thin film magnetic disk, a crystalline CrNi pre-seed layer is sputtered onto a substrate such as glass, followed by a RuAl seed layer. The CrNi pre-seed layer reduces grain size and its distribution, and improves in-plane crystallographic orientation, coercivity (Hc) and SNR. In a preferred embodiment the RuAl seed layer is followed by a Cr alloy underlayer. In a preferred embodiment the Cr alloy underlayer is followed by an onset layer and a magnetic layer, or by two or more magnetic layers antiferromagnetically coupled through one or more spacer layers. The crystalline CrNi pre-seed layer allows use of a thinner RuAl seed layer which results in smaller overall grain size, as well as a reduction in manufacturing cost due to relatively high cost of ruthenium. The CrNi pre-seed layer also allows use of a thinner Cr alloy underlayer which also contributes to reduce overall grain size.

33 Claims, 2 Drawing Sheets

THIN FILM MAGNETIC RECORDING DISK WITH A CHROMIUM-NICKEL PRE-SEED LAYER

FIELD OF THE INVENTION

This invention relates generally to the field of thin film materials used in magnetic disks for data storage devices such as disk drives, and more particularly to the use of an improved thin film magnetic disk with a chromium-nickel pre-seed layer

BACKGROUND OF THE INVENTION

The magnetic recording disk in a conventional drive assembly consists of a substrate, and a plurality of thin film deposited upon it. A variety of disk substrates such as NiP-coated AlMg, glass, glass ceramic, glassy carbon etc., are used. Disks that are commonly available in the market are made with an AlMg substrate on which a layer of amorphous NiP is electrolessly deposited. Such disks typically include an underlayer consisting of a thin film of chromium (Cr) or a Cr alloy, a cobalt-based magnetic alloy layer deposited on the underlayer, and a protective overcoat deposited on the magnetic layer.

Since nucleation and growth of Cr or Cr alloy underlayers on glass and most other alternative substrates differ significantly from those on NiP-coated AlMg substrates, different materials and layer structures are used on glass substrate disks to achieve optimum results. In cases where a substrate such as glass is chosen, a "seed layer" is typically sputter deposited between the substrate and the Cr-alloy underlayer. Several materials have been proposed in published papers and patents for seed layers such as: Al, Cr, CrNi, Ti, $Ni_3P$, MgO, Ta, C, W, Zr, AlN and NiAl on glass and other substrates. (See for example, "Seed Layer induced (002) crystallographic texture in NiAl underlayers," Lee, et al., J. Appl. Phys. 79(8), Apr. 15, 1996, p.4902ff). In a single magnetic layer disk, Laughlin, et al., have described use of a NiAl seed layer followed by a 2.5 nm thick Cr underlayer and a CoCrPt magnetic layer. The NiAl seed layer with the Cr underlayer was said to induce the ($10\bar{1}0$) texture in the magnetic layer. ("The Control and Characterization of the Crystallographic Texture of Longitudinal Thin Film Recording Media," IEEE Trans. Magnetic. 32(5) September 1996, 3632). The present invention involves the deposition of a pre-seed layer upon a substrate such as glass, to improve the crystallographic properties of subsequently fabricated layers, such that the magnetic disk of the present invention is fabricated with improved performance characteristics. Recently antiferromagnetically coupled (AFC) magnetic layers have been shown to improve thermal stability of longitudinal media with low remanent magnetization/thickness product (MrT) while improving SNR as described in "Antiferromagnetically coupled magnetic media layers for thermally stable high-density recording," by Fullerton et al., Applied Phys. Lett., Vol 77, Dec. 4, 2000. The same underlayer structure (pre-seed, seed and Cr-alloy underlayer) may be utilized either with the conventional magnetic layer (onset layer plus magnetic layer) or with the AFC structure which can contain two or more magnetic layers coupled antiferromagnetically through one or more spacer layers such as Ru. The present invention covers the use of a CrNi pre-seed layer for either structure.

SUMMARY OF INVENTION

The thin film disk of the present invention includes a thin film pre-seed layer having a crystalline structure. The pre-seed layer, which is a chromium-nickel (CrNi) alloy, is sputtered onto a substrate such as glass, followed by a ruthenium-aluminum (RuAl) seed layer. The crystalline pre-seed layer allows for the use of a thinner RuAl seed layer which results in a smaller overall grain size, as well as a reduction in manufacturing cost of the magnetic disk due to relatively high cost of ruthenium. The use of the CrNi pre-seed layer generally reduces the magnetic layer grain size and its distribution, and improves the in-plane crystallographic orientation, the coercivity (Hc) and the SNR (Signal-to-Noise Ratio) to generally increase the areal data storage density for disk storage products. The increased coercivity also allows for the use of a thinner Cr alloy underlayer, which also results in smaller overall grain size. Another benefit of the CrNi pre-seed layer is that it provides additional thermal conductivity, which helps prevent thermal erasures on a glass disk. Preferred embodiments of the present invention include an underlayer having an optimal concentration of Cr, and a cobalt based magnetic layer with an optimal concentration of Pt, boron and Cr.

An advantage of the magnetic disk of the present invention is that the use of a CrNi pre-seed layer improves the media coercivity for a film structure with a very thin RuAl seed layer and an ultra-thin Cr alloy underlayer.

Another advantage of the magnetic disk of the present invention is that the use of a CrNi pre-seed layer not only reduces usage of high cost RuAl, but also improves coercivity while maintaining a good SNR.

A further advantage of the magnetic disk of the present invention is that the use of a relatively thick CrNi pre-seed layer is advantageous in improving the thermal erasure problems related to a glass disk medium.

These and other features and advantages of the present invention will no doubt become apparent to those skilled in the art upon reading the following detailed description which makes reference to the several figures of the drawings.

DETAILED DESCRIPTION OF THE INVENTION

For longitudinal media on glass or other alternative substrates, it is important to control the c-axis in-plane crystallographic orientation and grain size of the magnetic cobalt alloy film. Continued improvements in signal-to-noise ratio (SNR) are also needed to further increase the areal density for magnetic media. It is known that the cobalt alloy magnetic films may be grown with the preferred in-plane orientations of ($10\bar{1}0$) or ($11\bar{2}0$) by first depositing an underlayer with a (112) or (200) preferred in-plane orientation, respectively. Co-pending, commonly assigned U.S. patent applications bearing Ser. Nos. 09/295,267 and 09/547,439 describe the use of RuAl seed layer with a B2 structure to obtain an underlayer with a (200) preferred in-plane orientation and a cobalt alloy magnetic film with the preferred in-plane orientation of (११२̄०). Co-pending, commonly assigned U.S. patent applications bearing Ser. Nos. 09/500,710 and 09/798,235 describe, respectively, the use of amorphous or nanocrystalline CrTa or AlTi as pre-seed layers and the use of amorphous or nanocrystalline CrTi of as a pre-seed layer, sputter-deposited onto a substrate, such as glass, followed by a RuAl layer with a B2 structure.

Figure 1:
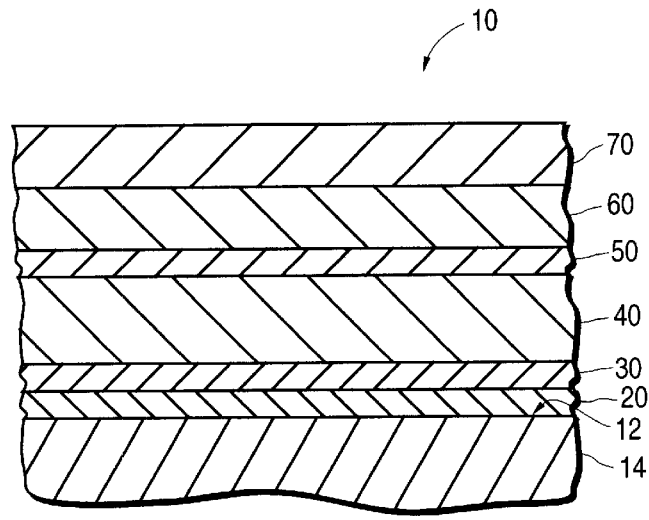
FIG. 1 is an illustration of a layer structure for a medium with a single magnetic layer according to the present invention.
Figure 2:
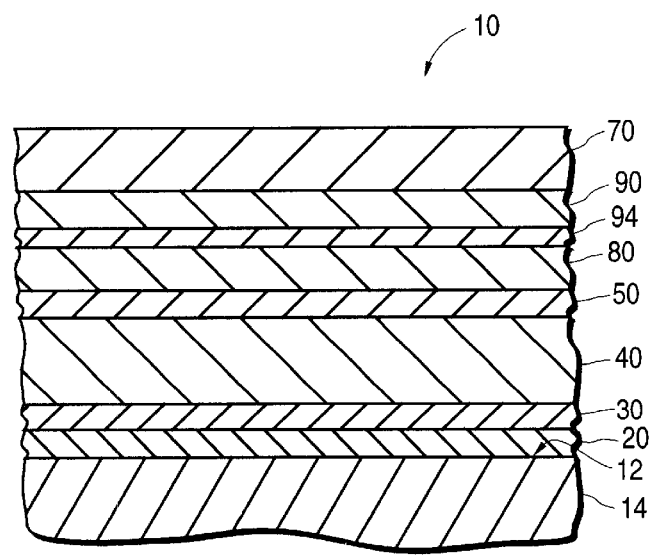
FIG. 2 is an illustration of a layer structure incorporating two antiferromagnetically coupled magnetic layers according to the present invention.

The pre-seed layer described herein is a crystalline layer of CrNi alloy which is preferably followed by a RuAl layer with a B2 structure. This structure may also be referred to as a CrNi/RuAl bi-layer structure. Reference is made to FIGS. 1 and 2 to illustrate the thin film layers in a magnetic thin film disk 10 embodying the invention.

In FIG. 1, an embodiment using a conventional magnetic layer in a disk 10 is described. The thin film layers of the present invention are deposited onto at least one and preferably both planar surfaces 12 of the magnetic disk substrate 14 to form the data recording area. The substrate 14 may be made of glass or any other suitable material. A CrNi pre-seed layer 20 of the present invention is first deposited onto a surface 12 of the substrate 14 preferably by conventional DC magnetron sputtering. In accordance with a preferred embodiment of the present invention, the thickness of the CrNi pre-seed layer 20 is in the range of 100 Å to 1000 Å., and a preferred thickness of the CrNi pre-seed layer 20 is in the range of 200 Å to 710 Å. The relative composition of Cr versus Ni is selected to produce a film with the desired crystalline structure, and in accordance with a preferred embodiment of the present invention, the Ni concentration in the CrNi pre-seed layer is from approximately 30 at. % to 50 at. % and is preferably approximately 45 at. %.

As depicted in FIG. 1, a RuAl seed layer 30 is next deposited directly onto the CrNi pre-seed layer 20 preferably by conventional DC magnetron sputtering techniques. A thickness range of the RuAl layer 30 is from 30 Å to 430 Å with a preferred value of approximately 200 Å. Ru is an expensive element so a reduction in the required thickness of the Ru layer reduces the expense of the disk 10 of the present invention.

An underlayer 40 is preferably next deposited onto the RuAl seed layer 30 and is comprised of a non-ferromagnetic material such as a chromium alloy e.g CrMo, CrV or CrTi. The preferred underlayer 40 of the present invention is CrTi containing approximately 10% Ti having a thickness of between 30 Å and 200 Å. The underlayer 40 is preferably, though not necessarily followed by the deposition of a Co-alloy onset layer 50 which is preferably of the type described in U.S. Pat. No. 6,143,388 to Bian, et al. which is commonly assigned with the present application. Onset layer materials may include magnetic and nonmagnetic films such as CoCr, CoPtCr, CoPtCrTa and CoPtCrB. A preferred onset layer is CoCr with Cr concentration between 28 and 31 at. %, with a thickness of approximately 5 Å to 40 Å. The onset layer 50 (if used) is followed by the deposition of a magnetic layer 60. The magnetic layer 60 is an alloy of cobalt, which typically contains platinum and chromium and may contain additional elements such as tantalum or boron, e.g. CoPtCrTa or CoPtCrB. The preferred magnetic film is CoPtCrB which is generally described in the Doerner et al. U.S. Pat. No. 5,523,173, and the preferred magnetic layer composition in atomic percent is $CoPt_xCr_yB_z$ where:

$10 < x < 16;$ $18 < y < 20;$ and $6 < z < 10.$

In accordance with a preferred embodiment of the present invention, the thickness of the magnetic layer 60 can be in the range of 50 Å–300 Å with 100 Å–200 Å being the preferred thickness range. The use, composition and thickness of an overcoat 70 on top of the magnetic layer 60 are not critical in practicing the invention, but a typical thin film disk might use a diamond-like carbon (DLC) overcoat less than 150 Å thick. In FIG. 2, the magnetic layer 60 of the disk 10 is replaced with a layered structure that contains two magnetic layers 80 and 90 that are antiferromagnetically coupled through a spacer layer 94 which is preferably composed of Ru. More than two magnetic layers antiferromagnetically coupled can also be incorporated as needed for a particular disk application. The identically numbered layers in FIG. 2 are identified and described in relation to the discussion of FIG. 1 hereabove.

The crystallographic relation between the pre-seed layer 20 of CrNi alloy and the seed layer 30 of preferably RuAl with a B2 structure promotes the growth of RuAl in a (200) orientation. As a result, the CrNi pre-seed layer 20 of this invention allows the use of a thinner RuAl seed layer 30 to reduce overall grain size, as well as manufacturing costs due to relatively high cost of ruthenium. The use of the CrNi pre-seed layer 20 also increases coercivity which allows the use of a thinner Cr alloy underlayer 40 which also has a (200) orientation and which contributes to decreased grain size. The use of the crystalline CrNi pre-seed layer 20 thus reduces grain size and its distribution, and improves in-plane crystallographic orientation, coercivity and SNR.

Table 1 compares magnetic and recording performance of four disks with and without the crystalline CrNi pre-seed layer. It is seen that Disk 2 uses a CrNi pre-seed layer and a thinner RuAl layer, with combined thickness similar to that of RuAl layer in Disk 1 which has no pre-seed layer. Disks 1 and 2 have comparable signal-to-noise ratio (SNR). Disk 2 with the CrNi pre-seed layer exhibits higher coercivity (Hc) than Disk 1. As can be seen by review of the performance data of Disks 3 and 4, Hc can be further increased by increasing thickness of the CrNi pre-seed layer, e.g., Hc increases from 3626, 3786 to 3987 Oe as CrNi the pre-seed layer thickness increases from 200 Å, 430 Å to 710 Å.

TABLE 1

| | Disk Structure | Thickness of pre-seed layer (Å) | Thickness of RuAl seed layer (Å) | Hc (Oe) | Mrt (memu /cm$^2$) | SNR (dB) |
|---|---|---|---|---|---|---|
| 1 | $RuAl_{50}/CrTi_{10}/CoCr_{28}/CoPt_{12}Cr_{20}B_6$ | 0 | 400 | 3578 | 0.44 | 15.4 |
| 2 | $CrNi_{45}/RuAl_{50}/CrTi_{10}/CoCr_{28}/CoPt_{12}Cr_{20}B_6$ | 200 | 200 | 3626 | 0.48 | 15.6 |

TABLE 1-continued

| | Disk Structure | Thickness of pre-seed layer (Å) | Thickness of RuAl seed layer (Å) | Hc (Oe) | Mrt (memu /cm$^2$) | SNR (dB) |
|---|---|---|---|---|---|---|
| 3 | CrNi$_{45}$/RuAl$_{50}$/CrTi$_{10}$/CoCr$_{28}$/CoPt$_{12}$Cr$_{20}$B$_6$ | 430 | 200 | 3786 | 0.48 | 15.5 |
| 4 | CrNi$_{45}$/RuAl$_{50}$/CrTi$_{10}$/CoCr$_{28}$/CoPt$_{12}$Cr$_{20}$B$_6$ | 710 | 200 | 3987 | 0.49 | 15.4 |

Figure 3:
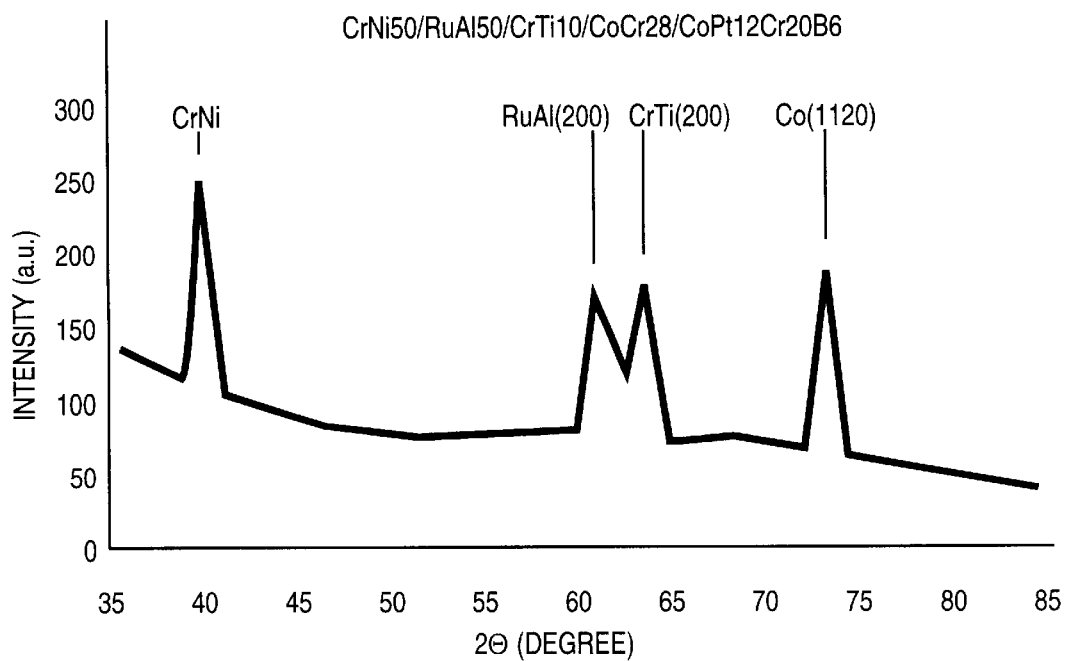
FIG. 3 is an X-ray diffraction plot for a thin film disk structure including a pre-seed layer of $CrNi_{45}$ and a seed layer of $RuAl_{50}$ using the structure in FIG. 1 according to the present invention.

FIG. 3 shows the X-ray diffraction spectrum for Disk 2, which corresponds to a disk depicted in FIG. 1 and described hereabove. The spectrum shows strong RuAl (200), CrTi (200) and CoPtCrB (11$\bar{2}$0) diffraction peaks, indicating good c-axis in-plane orientation of the CoPtCrB layer. There is a crystalline CrNi diffraction peak observed at 2-theta angle of 39.8°, corresponding to a d-spacing of 2.26 Å.

In summary, the crystalline CrNi pre-seed layer not only reduces usage of high-cost RuAl, but also improves coercivity while maintaining good SNR. It is also known that recorded data can be thermally erased by heat generated during read and write process of disk drives. Use of a relatively thick CrNi pre-seed layer can potentially improve the thermal erasure issue related to glass disk media.

Figure 4:
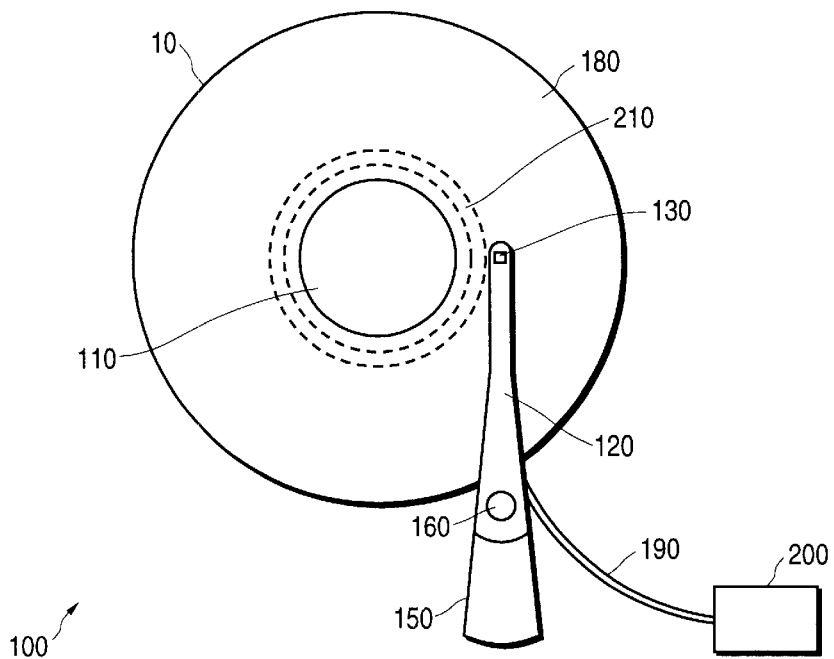
FIG. 4 is a top plan view of a disk drive illustrating the structural components of a disk drive with a rotary actuator and a magnetic disk of the present invention.

FIG. 4 is a top view illustrating a disk drive 100 with a rotary actuator 120 in which a thin film disk 10 according to a preferred embodiment of the present invention is used. The disk drive 100 includes of one or more magnetic recording disks 10 of the present invention mounted on a spindle 110, which is rotatable by an in-hub electrical motor (not shown). An actuator assembly 120 supports a slider 130, which contains one or more read/write heads. The actuator assembly 120 is composed of a plurality of actuators and sliders arranged in a vertical stack with the actuators supporting the sliders being in contact with the surfaces of the disks 10 when the disks are not rotating or being unloaded to avoid contact. A voice coil motor (VCM) 150 moves the actuator assembly 120 relative to the disks by causing the assembly to pivot around a shaft 160. The read/write heads are typically contained in air bearing sliders 130 adapted for flying above the surface of the disks 10 when rotating at a sufficient speed. During the operation of the disk drive 100, if the sliders fly above the disks the VCM moves the sliders 130 in an arcuate path across the disks so as to allow the heads to be positioned to read and write magnetic information from the circular tracks which are formed in the data area 180. The data area 180 is coated with the thin films of the present invention described hereinabove. Electrical signals to and from the heads and the VCM are carried by a flex cable 190 to drive electronics 200. When the disk drive is not operating and during such periods of time as when the rotation of the disks is either starting or stopping, the sliders 130 may either be removed from the disks using load/unload ramps (not shown) or parked in physical contact with the surface of the disks in a landing zone or contact start/stop (CSS) area 210, which is not used for data storage even though the magnetic coating extends over this area. If the sliders are unloaded from the disks during non-operation, there is no need to have a CSS area 210 and more of the disk becomes available for data storage. Although the disk drive has been described with air bearing sliders the disk of the present invention may easily be used in other storage devices having near contact, or contact recording sliders.

While the preferred embodiments of the present invention have been illustrated in detail, it will be apparent to the one skilled in the art that alternative embodiments of the invention are realizable without deviating from the scope and spirit of the invention.

What is claimed is:

1. A thin film magnetic disk comprising:
   a substrate;
   a pre-seed layer made of CrNi alloy being deposited upon said substrate, said CrNi pre-seed layer having a crystalline structure;
   a ruthenium-aluminum (RuAl) seed layer deposited upon the pre-seed layer;
   at least one magnetic layer deposited over the layer of RuAl.

2. The magnetic disk of claim 1, wherein the thickness of the CrNi pre-seed layer is in the range of 100 Å to 1000 Å.

3. The magnetic disk of claim 1, wherein the thickness of the CrNi pre-seed layer is in the range of 200 Å to 710 Å.

4. The magnetic disk of claim 1, wherein the Ni concentration in the pre-seed layer is approximately 30 to 50 at. %.

5. The magnetic disk of claim 1, wherein the Ni concentration in the pre-seed layer is approximately 45 at. %.

6. The magnetic disk of claim 1, wherein the thickness of the RuAl seed layer is between 30 Å and 430 Å in thickness.

7. The magnetic disk of claim 1, wherein the RuAl seed layer has a B2 structure.

8. The magnetic disk of claim 1, wherein the RuAl seed layer has a (200) preferred in-plane orientation.

9. The magnetic disk of claim 1, also comprising an underlayer deposited between the RuAl and magnetic layers, and wherein the underlayer is a chromium alloy containing approximately 10 at. % titanium.

10. The magnetic disk of claim 9, wherein the underlayer comprises CrTi with a (200) preferred in-plane orientation.

11. The magnetic disk of claim 9, wherein the underlayer comprises CrTi and is between 30 Å and 200 Å in thickness.

12. The magnetic disk of claim 9 further comprising at least one onset layer deposited upon the underlayer.

13. The magnetic disk of claim 12, wherein the onset layer is ferromagnetic in nature.

14. The magnetic disk of claim 12, wherein the onset layer comprises a CoCr alloy.

15. The magnetic disk of claim 12, wherein the onset layer comprises a CoCr alloy with Cr composition of approximately 28 at. %.

16. The disk of claim 12, wherein the thickness of the onset layer is between 5 Å to 40 Å.

17. The magnetic disk of claim 1 also comprising two or more magnetic layers antiferromagnetically coupled through one or more spacer layers.

18. The magnetic disk of claim 17 where said one or more spacer layers are comprised of Ru.

19. A thin film magnetic disk comprising:
   a substrate;
   a pre-seed layer made of CrNi alloy being deposited upon said substrate with a crystalline structure, wherein the thickness of the CrNi pre-seed layer is in the range of 100 Å to 1000 Å, and wherein the Ni concentration in the pre-seed layer is approximately 30–50 at. %;
   a ruthenium-aluminum (RuAl) seed layer deposited upon the pre-seed layer, wherein the RuAl seed layer has a thickness between 30 Å and 430 Å; and at least one magnetic layer deposited over the layer of RuAl.

20. The magnetic disk of claim 19 wherein the thickness of the CrNi pre-seed layer is in the range of approximately 200 Å to approximately 710 Å, and wherein the Ni concentration in the pre-seed layer is approximately 45 at. %, and wherein the RuAl seed layer has a (200) preferred in-plane orientation, and wherein an underlayer is deposited upon said RuAl seed layer, said underlayer being comprised of a chromium alloy containing approximately 10 at. % titanium, and wherein the thickness of said underlayer is between approximately 30 Å and 200 Å.

21. The disk of claim 20 further comprising at least one onset layer deposited upon the underlayer, wherein the onset layer is ferromagnetic in nature and comprises a CoCr alloy with a Cr composition of approximately 28 at. %.

22. A disk drive comprising:
a motor for rotating a spindle;
a thin film magnetic disk mounted on the spindle;
an actuator assembly including a head for writing magnetic information on the disk as it rotates, wherein said thin film magnetic disk includes:
  a substrate;
  a pre-seed layer made of CrNi alloy being deposited upon said substrate with a crystalline structure, wherein the thickness of the CrNi pre-seed layer is in the range of 100 Å to 1000 Å, and wherein the Ni concentration in the pre-seed layer is approximately 30–50 at. %;
  a ruthenium-aluminum (RuAl) seed layer deposited upon the pre-seed layer, wherein the RuAl seed layer has thickness between 30 Å and 430 Å;
  at least one non-magnetic underlayer deposited upon the RuAl seed layer; wherein the underlayer is a chromium alloy containing approximately 10 at. % titanium, and wherein the thickness of the underlayer is between 30 Å and 200 Å; and
  at least one magnetic layer deposited over the layer of RuAl.

23. The disk drive of claim 22 further comprising at least one onset layer deposited upon the underlayer, wherein the onset layer comprises a CoCr alloy with Cr composition approximately 28 at.%.

24. A method of manufacturing a thin film magnetic disk comprising:
depositing a thin film pre-seed layer made of CrNi alloy with a crystalline structure upon a substrate;
depositing a crystalline ruthenium-aluminum (RuAl) seed layer upon the pre-seed layer;
depositing at least one magnetic layer over the layer of RuAl.

25. The method of claim 24, wherein the thickness of the CrNi pre-seed layer is in the range of 100 Å to 1000 Å.

26. The method of claim 24, wherein the thickness of the CrNi pre-seed layer is in the range of 200 Å to 710 Å.

27. The method of claim 24, wherein the Ni concentration in the pre-seed layer is approximately 30–50 at. %.

28. The method of claim 24, wherein the Ni concentration in the pre-seed layer is approximately 45 at. %.

29. The method of claim 24, wherein the RuAl seed layer is between 30 Å and 430 Å in thickness.

30. The method of claim 24, wherein an underlayer is deposited upon said RuAl seed layer, said underlayer being a chromium alloy containing approximately 10 at. % titanium, and is between 30 Å and 200 Å in thickness.

31. The method of claim 30 further comprising the deposition of at least one onset layer upon the underlayer, wherein the onset layer comprises a CoCr alloy.

32. A method of manufacturing a thin film magnetic disk comprising:
depositing a thin film pre-seed layer made of CrNi alloy with a crystalline structure upon a substrate, wherein the thickness of the CrNi pre-seed layer is in the range of 100 Å to 1000 Å, and wherein the Ni concentration in the pre-seed layer is approximately 30–50 at. %;
depositing a crystalline ruthenium-aluminum (RuAl) seed layer upon the pre-seed layer, wherein the ruthenium-aluminum (RuAl) seed layer has a thickness between 30 Å and 430 Å;
depositing at least one non-magnetic underlayer upon the RuAl seed layer; wherein the underlayer is a CrTi alloy containing approximately 10 at. % titanium, and wherein the thickness of the underlayer is between 30 Å and 200 Å; and
depositing at least one magnetic layer over the layer of CrTi.

33. The method of claim 32 further comprising the step of depositing at least one onset layer upon the underlayer, wherein the onset layer comprises a CoCr alloy with Cr composition of approximately 28 at. %.

* * * * *